J. BLAIR.
HORSE COVER.
APPLICATION FILED JAN. 22, 1908.

921,580.

Patented May 11, 1909.
2 SHEETS—SHEET 1.

Witnesses
L. B. James
Geo. W. Sues

Inventor
John Blair
By Chandler & Chandler
Attorneys

J. BLAIR.
HORSE COVER.
APPLICATION FILED JAN. 22, 1908.

921,580.

Patented May 11, 1909.
2 SHEETS—SHEET 2.

Witnesses
L. B. James
Geo. W. Sues

Inventor
John Blair
By Chandlee & Chandlee
Attorneys

UNITED STATES PATENT OFFICE.

JOHN BLAIR, OF LINCOLN, NEBRASKA.

HORSE-COVER.

No. 921,580.     Specification of Letters Patent.     Patented May 11, 1909.

Application filed January 22, 1908. Serial No. 412,158.

*To all whom it may concern:*

Be it known that I, JOHN BLAIR, a citizen of the United States, residing at Lincoln, in the county of Lancaster, State of Nebraska, have invented certain new and useful Improvements in Horse-Covers; and I do hereby declare the following to be a full, clear, and exact description of the invention, such as will enable others skilled in the art to which it appertains to make and use the same.

This invention has relation to new and useful improvements in horse covers.

The object of my invention is to provide a horse cover comprising a stiff shield adapted to be carried by the shafts of the vehicle and arranged to hood and shield the body of the horse, as will be described more fully hereinafter.

Figure 1:
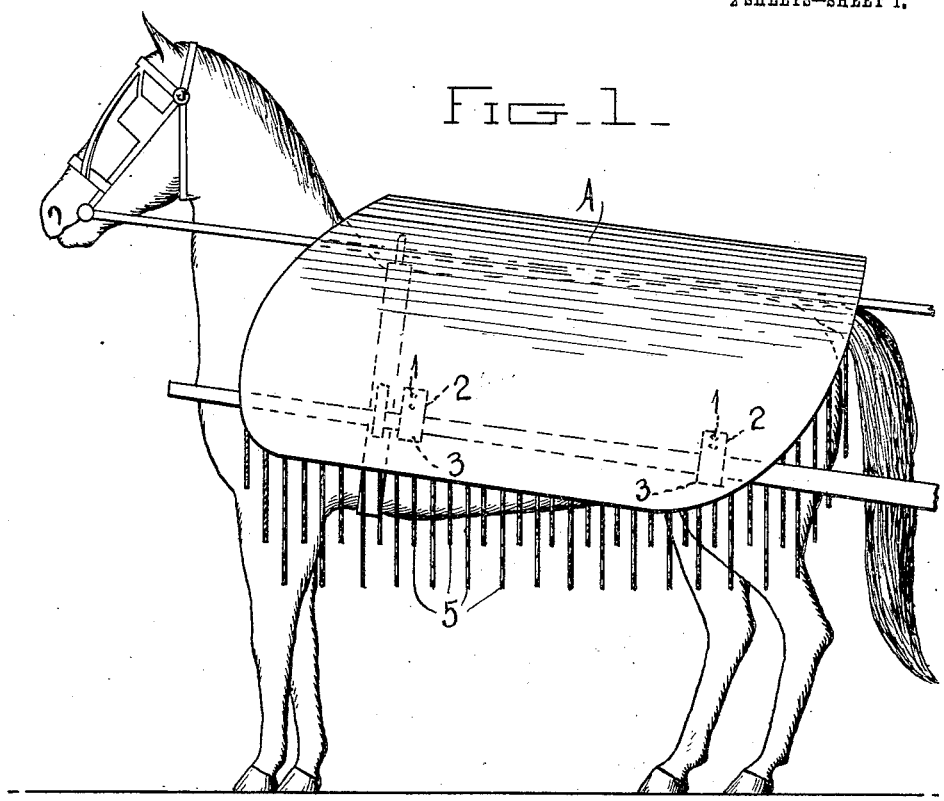
Figure 2:
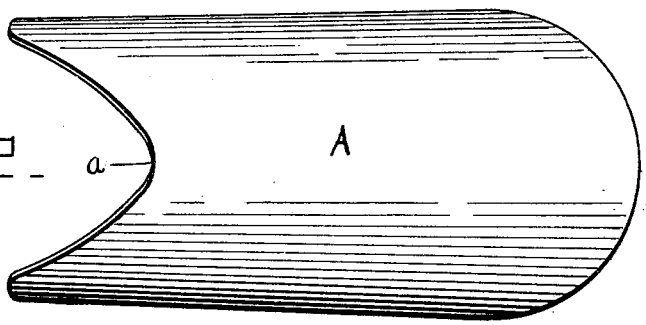
Figure 3:
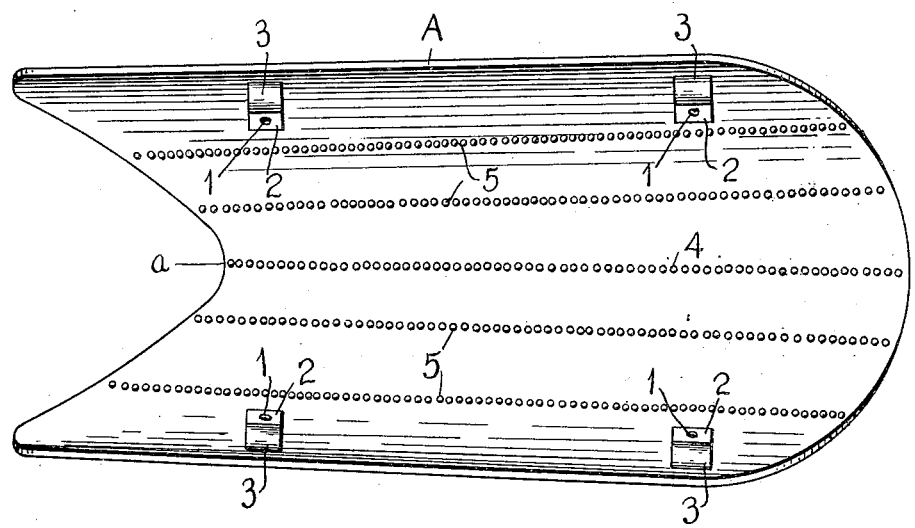

In the accompanying drawings I have shown in Figure 1 a view of a horse provided with my cover. Fig. 2 shows a top view of my horse cover. Fig. 3 shows a bottom view of my horse cover and Fig. 4 an end view thereof.

The object of my invention is to provide a horse cover adapted to be carried by the shafts of the vehicle to which the horse is hitched so as to hood and shield the body of the horse in such a manner however that there is provided an intervening air space between the cover and the horse, a plurality of strands being secured to the cover and acting as fly brushes and to this end the sides of the shield are vertical and spaced apart at a greater distance than the spaces between the thills or shafts.

Figure 4:
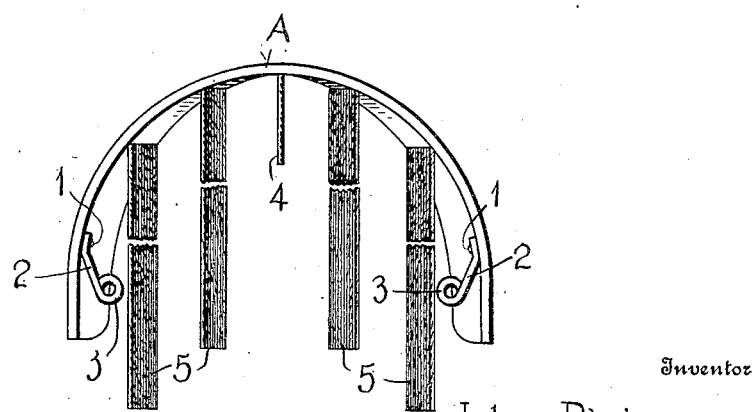

In the accompanying drawings I have shown at A a horse cover constructed according to my invention. In front this horse cover has a portion removed to provide a recess *a* within which is held the horse's neck. This shield is made of leather, papier mâché or any other suitable material, it being understood that the same is water-proof to provide an effective rain cover for the horse. Upon the inside I provide this stiff cover which is curved and is approximately semi-circular in cross section as shown in Fig. 4, at four points with the bars 2, each inclined inwardly and downwardly and terminating in a loop 3, these bars being secured rigidly to the cover by means of suitable rivets 1 as shown in Fig. 3. Upon the inside I provide this horse cover with the centrally disposed series of pendent strands 4 as clearly shown in Fig. 4 and upon the sides with the two sets of pendent strands 5, all of these strands acting as fly brushes.

The cover is entirely independent of the horse and is carried entirely by the shafts or thills as shown in Fig. 1, and acts as a shield and protector in preserving the harness against weather wear as well as protecting the horse. In hot weather the cover acts as a shade for the horse and keeps the animal cool, especially as the air is permitted to freely circulate between the cover and the horse. As the horse has a movement independent of the cover, the animal is effectively protected against flies and insects by means of the pendent strands 4 and 5. In winter when the horse is blanketed, this cover acts as a rain and snow protector for the blanket, keeping the same dry.

The device is neat in appearance, simple in construction, and may be inexpensively manufactured and attached to thills or shafts of various forms and distances apart, as the flexibility of the shield permits it to be distended or compressed laterally to the thills or shafts.

Having thus described my invention, what I claim as new is—

The combination with a pair of thills of a horse cover comprising a shield of rigid material having a curved upper portion and vertical sides spaced a greater distance apart than the thills, and a plurality of bars rigidly connected at their upper ends to the inner faces of the vertical portions of the shield and inclining inwardly and downwardly with their inner lower ends provided with eyes bearing over the thills, whereby the shield is supported from the thills and adapted to be spaced from the animal while traveling between the thills.

In testimony whereof, I affix my signature, in presence of two witnesses.

JOHN BLAIR.

Witnesses:
WILLIAM R. STRINE,
JOHN McWILLIAMS.